United States Patent [19]

Kang

[11] Patent Number: 5,828,808
[45] Date of Patent: Oct. 27, 1998

[54] PICTURE DECODER FOR PREVENTING JITTER IN FAST-PLAY MODES OF OPERATION

[75] Inventor: Jung-suk Kang, Seoul, Rep. of Korea

[73] Assignee: Samsung Electronics Co., Ltd., Kyungki-do, Rep. of Korea

[21] Appl. No.: 755,909

[22] Filed: Nov. 25, 1996

[30] Foreign Application Priority Data

Nov. 24, 1995 [KR] Rep. of Korea .................. 1995 43666

[51] Int. Cl.⁶ .................................................. H04N 5/783
[52] U.S. Cl. .............................................. 386/68; 348/497
[58] Field of Search ................................. 386/67, 68, 81, 386/82, 114, 90, 89, 85; 348/497

[56] References Cited

U.S. PATENT DOCUMENTS 5,592,299  1/1997  Boyce et al. ............................... 386/81
5,615,018  3/1997  Wu et al. .................................. 386/68
5,687,275  11/1997 Lane et al. ................................ 386/67

*Primary Examiner*—Victor R. Kostak
*Attorney, Agent, or Firm*—Sughrue, Mion, Zinn, Macpeak & Seas, PLLC

[57] ABSTRACT

A picture decoder which prevents picture jitter when operating in a fast play mode. The picture decoder has a picture jitter preventing apparatus, which includes a picture coding extension region detector for detecting a picture coding extension region from picture data coded according to the MPEG2 standard, information region detector for detecting a region having top_field_first and repeat_first_field information from the detected picture coding extension region signal, and an information converter for converting values of top_field_first and repeat_first_field into 1 and 0, respectively, when in the fast play mode, and outputting the picture data free of jitter.

7 Claims, 6 Drawing Sheets

PICTURE DECODER FOR PREVENTING JITTER IN FAST-PLAY MODES OF OPERATION

BACKGROUND OF THE INVENTION

The present invention relates to a picture decoding apparatus. More particularly, the present invention is directed to decoding data according to a MPEG2 standard, capable of preventing picture jitter when operating in a fast play mode.

Recently, considerable attention has been given to recording and storing digital data for video applications, because it is superior to conventional analog recording with respect to picture quality, reliability and ease of data processing. Consequently, much research has been conducted in digital data processing and recording. Digital data processing is applied to many applications, including high definition television (HDTV), video compact disks (VCD), and video on demand (VOD), as examples.

When picture data is processed digitally, the amount of information that needs to be processed is several times that compared to the analog mode. Accordingly, the information must be compressed by a coder for effective data transmission and storage. In addition, a decoder is required for restoring the compressed data back to the original picture information. As one method of compressing picture data, the Moving Picture Experts Group (MPEG) committee under the International Standard Organization (ISO) developed the MPEG2 standard, which is now widely used internationally.

In general, a picture-related signal complies with the National Television System Committee (NTSC) standard. According to the NTSC standard, 30 picture frames are displayed on a television monitor per second, and each frame includes a top field and a bottom field. Thus, 60 fields of a picture per second are scanned on a screen by repeating the top and bottom fields, thereby displaying a natural picture. Accordingly, 30 frames of a picture per second must be recorded in a digital storage medium through MPEG coding, and 30 frames of picture must be displayed on a screen through decoding.

FIG. 1 illustrates a frame structure of an MPEG-coded picture signal, which is a typical example of an MPEG2 main profile (MP) and main level (ML) frame structure. As shown in FIG. 1, according to the MPEG standard, a picture is classified into three frames for coding, including an intra-frame (I picture) which is a picture signal coded using a special correlation within a frame, a predicted frame (P picture) which is a picture signal coded using a correlation with a predicted I frame, and an interpolated frame (B picture) which is a picture signal coded using a bi-directional correlation between the I frame and P frame.

The coding is performed in the following sequence. First, the I picture (frame 2) is coded, and then the B pictures (frames 0 and 1) are coded using the correlation between the I picture and the preceding P picture. A P picture (frame 5) is coded using the correlation with the I picture (frame 2). Then, B pictures (frames 3 and 4) are coded using a correlation between the I picture (frame 2) and the P picture (frame 5). The picture signal is finally stored in a storing medium in the above-stated sequence, and the stored picture signal is reproduced in the original frame sequence after being decoded.

In contrast, when coding a movie to store on a storing medium, an extra process is required since a movie includes 24 frames per second. That is, after converting a movie from 24 frames per second to 30 frames per second, the movie is recorded via an MPEG coding process. On the other hand, after having converting a movie of 24 frames per second to the MPEG coding standard, the MPEG-coded frames are stored and later converted into 30 frames per second by a decoder. Hence, since the amount of data is reduced by the latter method, it is more widely used than the former method. The MPEG standard also provides a method for reproducing a picture signal which is coded with 24 frames per second on a screen at 30 frames per second.

According to the MPEG2, successive picture signals are processed with the hierarchical structure including sequence, group of picture (GOP), picture and a low-grade layer. Here, the sequence includes a plurality of GOPs. Each GOP consists of a plurality of pictures, and the picture includes a set of a plurality of low-grade layers, respectively. Each layer such as sequence, GOP, picture, and so on includes a header, which enables classifying each layer and providing information characteristics of each layer. Particularly, the 'frame_rate_code' information included in a header of the sequence and the 'top_field_first', 'repeat_first_field' and 'progressive_frame' information included in a picture coding extension region of a header of the picture are used to convert the picture data coded with 24 frames into 30 frames. The 'frame_rate_code' represents the number of frames per second, the 'top_field_first' having a value of '1' is for outputting a top field first, and the 'repeat_first_field' having a value of '1' is for repeatedly outputting a field which is a first output. Also, the 'progressive_frame' having a value of '1' means that a frame of the coded picture includes two fields which occur at the same time. Thus, even though a movie includes frames without being divided into fields, two fields are extracted from a frame on the MPEG coding, so that 'progressive_frame' has a value of '1'.

In the case of a television (TV) signal, a frame includes two fields having time duration of ⅟₆₀ second, so that 'progressive_frame' has a value of '0'. Only when the 'progressive_frame' has a value of '1', that is, a movie is coded, the 'repeat_first_field' is defined. When coding a picture having 24 frames per second, the 'frame_rate_code' is set to 30 frames per second, the 'progressive_frame' is set to a value of '1', and the 'top_field_first' and 'repeat_first_field' are appropriately set, thereby outputting 30 frames per second in the decoding process.

FIG. 2 shows examples of the 'top_field_first' and 'repeat_first_field' when coding a picture having 24 frames per second. FIG. 3 illustrates a series of operations of converting the coded picture seen in FIG. 2 into 30 frames through a decoding process. As shown in FIG. 3, when the 'repeat_first_field' has a value of '1', one field is further inserted, providing a picture of 30 frames per second.

In a fast play mode for decoding a picture coded as shown in FIG. 2, for example, the fast play mode is attained by decoding only I and P pictures, skipping the B pictures. FIG. 4 is a diagram showing a frame structure in a fast play mode. As shown in FIG. 4, a decoder decodes a picture with reference to only the 'top_field_first' and 'repeat_first_field' of a corresponding picture header. Thus, successive top fields or successive bottom fields are output on the fast play mode due to the influence of skipping B pictures. According to the NTSC standard, a top field and a bottom field must alternately be output for a natural, clear picture, however, according to the above operation, a picture having jitter is produced.

SUMMARY OF THE INVENTION

To overcome the above and other problems, it is an object of the present invention to provide a decoding apparatus for preventing picture jitter when operating in a fast play mode.

It is a further object of the present invention to provide a decoding apparatus for preventing picture jitter when decoding a picture which is coded with 24 frames per second according to the MPEG2 standard.

To achieve the above and other objects, there is provided a picture decoding apparatus for preventing picture jitter when operating in a fast play mode. The apparatus includes a picture coding extension region detector for detecting a picture coding extension region from picture data which is coded according to the MPEG2 standard and for outputting the result together with the picture data; an information region detector for detecting a region having 'top_field_first' and 'repeat_first_field' information from the detected picture coding extension region signal and for outputting the result together with the picture data; and an information converter for converting values of 'top_field_first' and 'repeat_first_field' into '1' and '0', respectively, if a corresponding data section is an information region in the fast play mode, by receiving the detected information region signal and a fast play mode signal, and transmitting the picture data.

BRIEF DESCRIPTION OF THE DRAWINGS

The above objects and advantages of the present invention will become more apparent in view of the following detailed description of a preferred embodiment thereof with reference to the attached drawings in which.

DETAILED DESCRIPTION OF A PREFERRED EMBODIMENT OF THE PRESENT INVENTION

Figure 1:
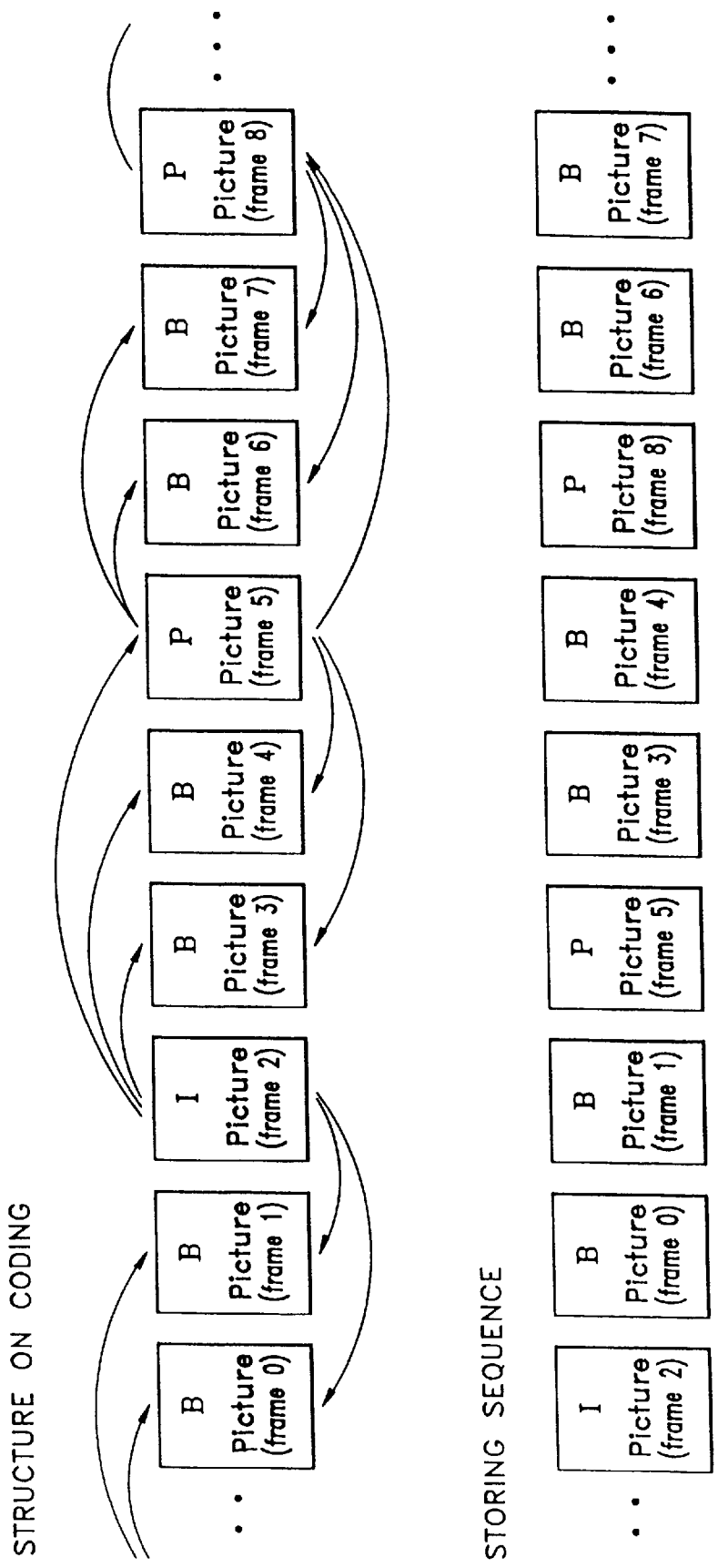
FIG. 1 is a diagram showing a frame structure of a picture by the MPEG2 coding standard.
Figure 2:
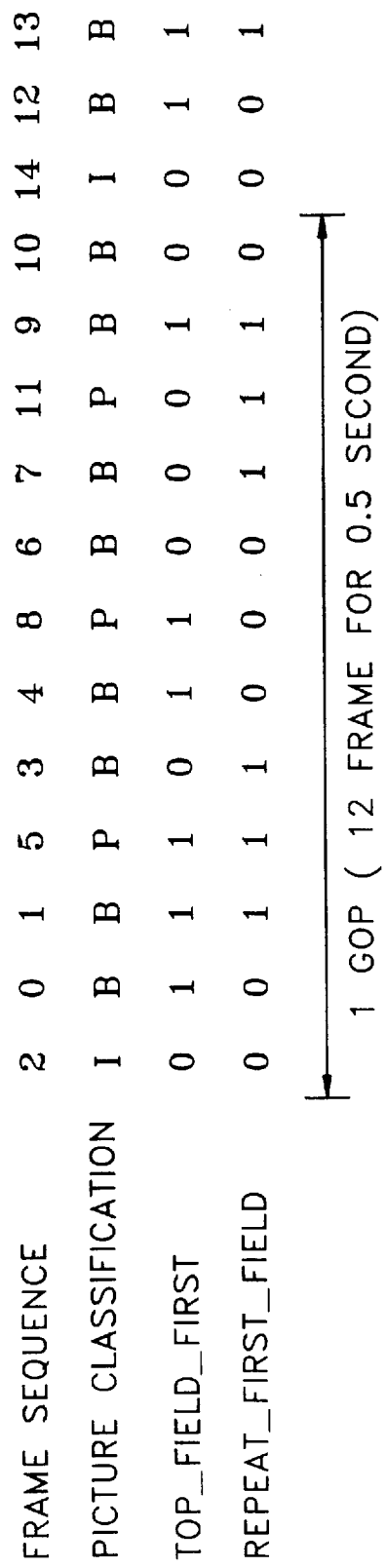
FIG. 2 is a diagram showing a coding example of a picture having 24 frames per second.
Figure 3:
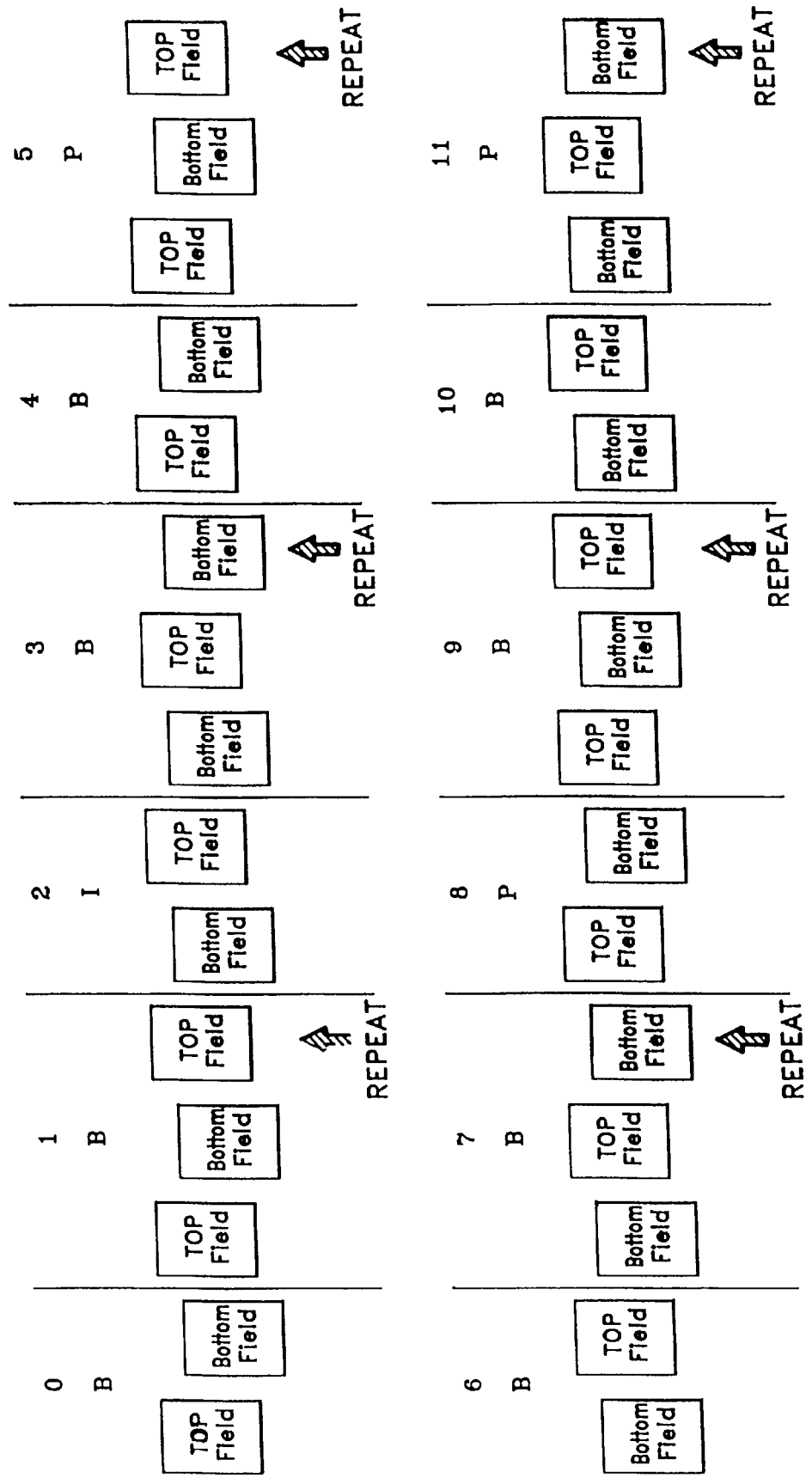
FIG. 3 is a diagram showing a frame structure of the picture shown in FIG. 2 by a decoding process.
Figure 4:
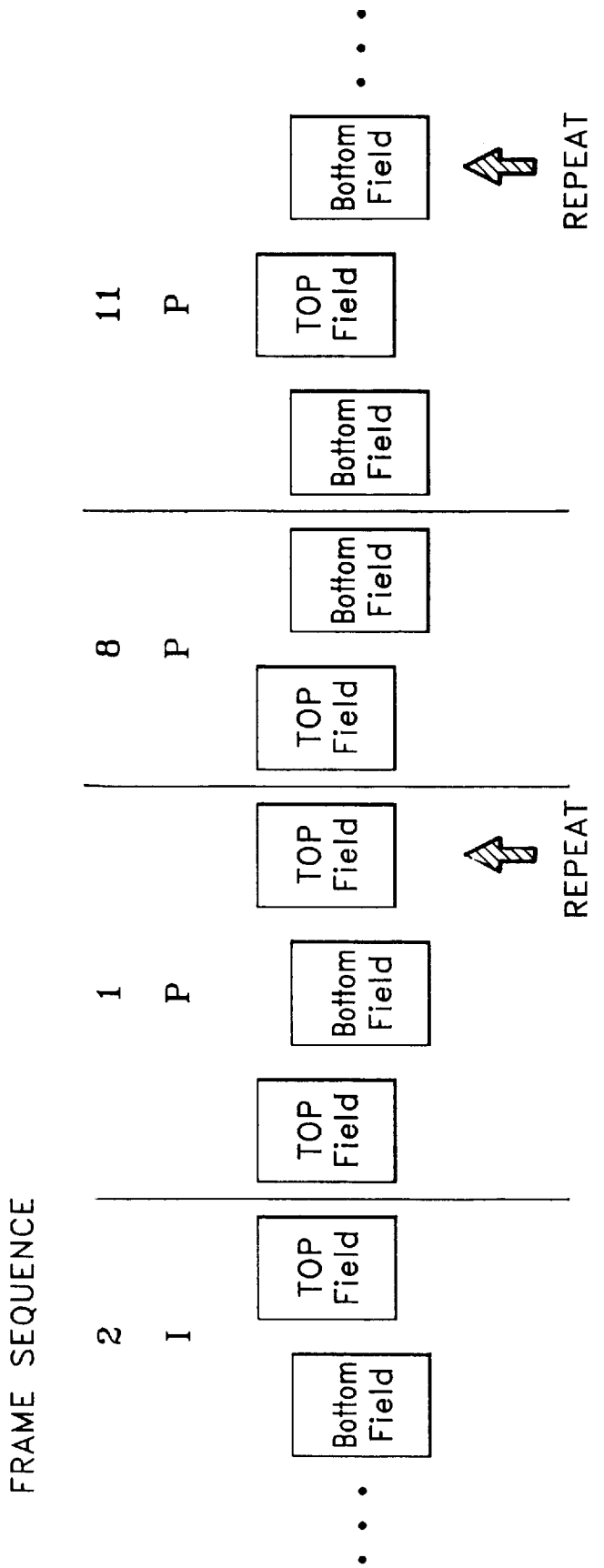
FIG. 4 is a diagram showing a frame structure of the picture shown in FIG. 2 in a fast play mode.
Figure 5:
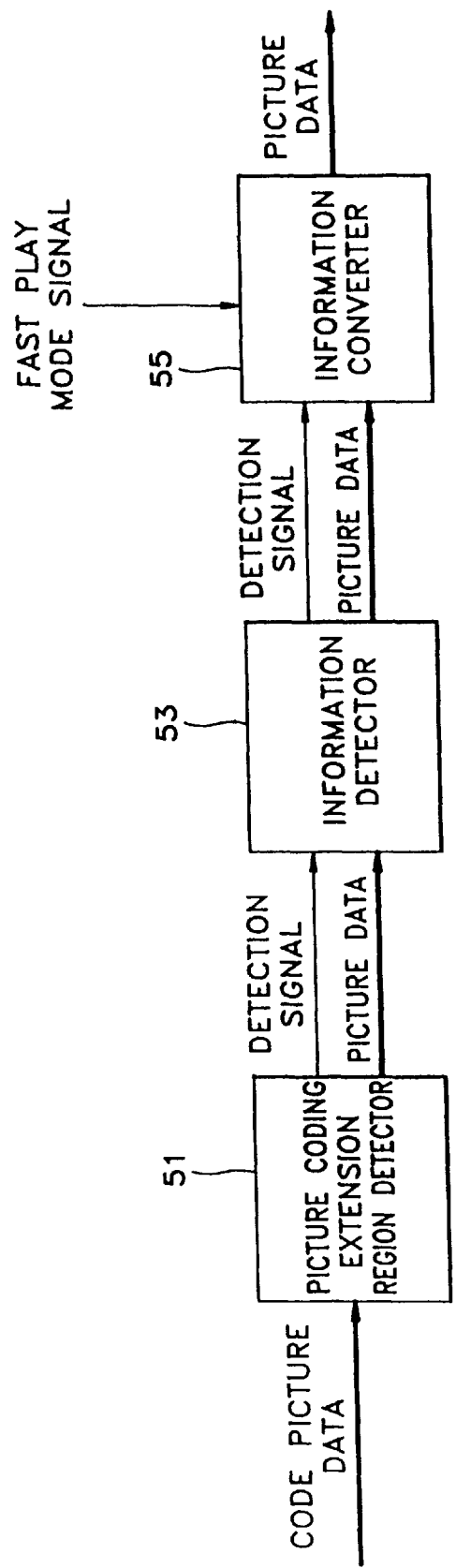
FIG. 5 is a block diagram of a picture decoding apparatus for preventing picture jitter when operating in a fast play mode according to the present invention.

Referring to FIG. 5, a picture decoding apparatus for preventing picture jitter when operating in a fast play mode according to the present invention is shown. The apparatus includes a picture coding extension region detector 51, which detects only a picture coding extension region from coded picture data, an information region detector 53, which detects 'top_field_first' and 'repeat_first_field' information from the detected picture coding extension region signal, and an information converter 55, which converts the detected information region into a specific value.

Figure 6:
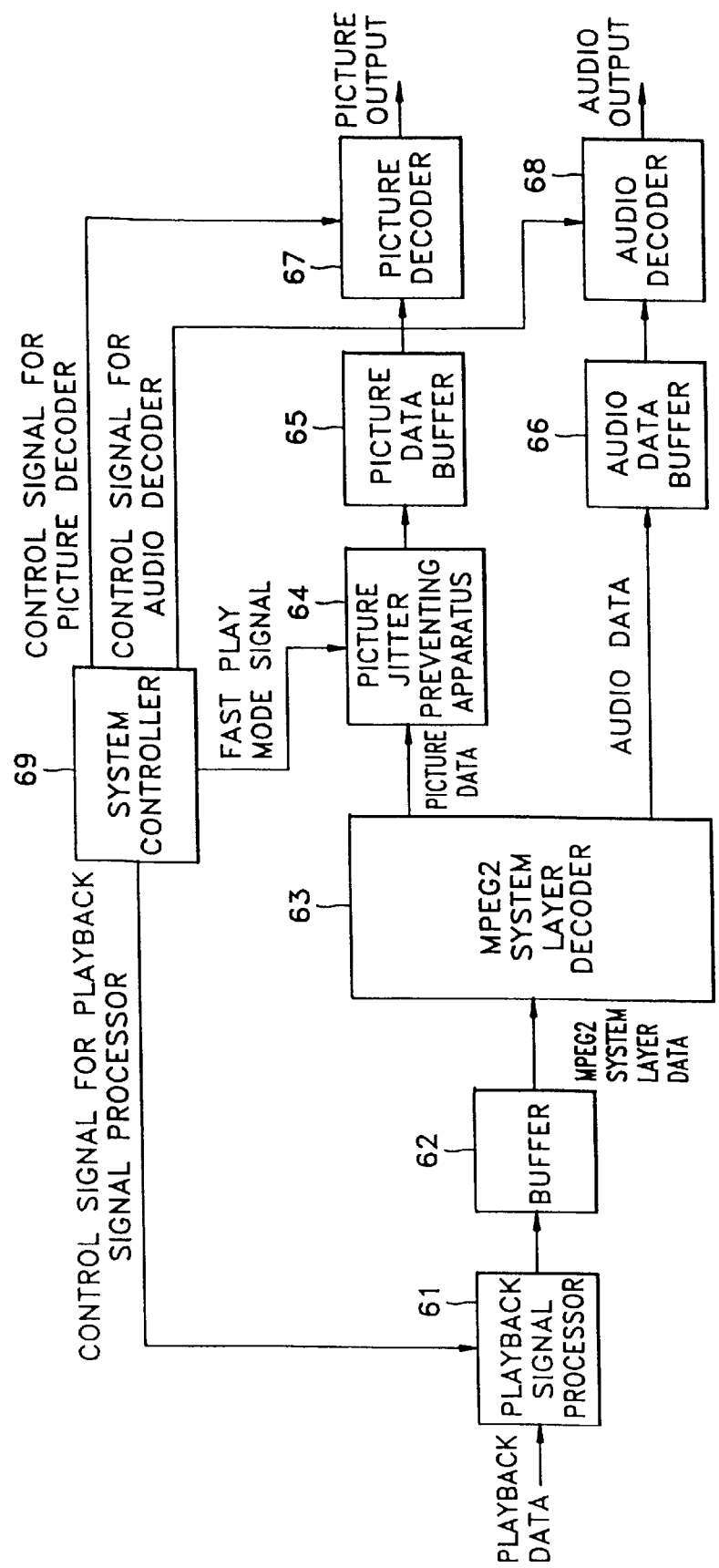
FIG. 6 is a diagram showing an example of a system incorporating the picture decoding apparatus of FIG. 5.

FIG. 6 illustrates an example of a system incorporating the picture decoding apparatus according to the present invention. As shown in FIG. 6, a picture signal and an audio signal are output after decoding data read from a storing medium.

Operation of the picture decoding apparatus and the manner in which picture jitter is prevented in accordance with the present invention will be described with reference to FIGS. 5 and 6.

A system controller 69 transmits a play start signal to a playback signal processor 61, which then performs a series of processes such as error-correction after reading playback data from a storing medium. The data is then transmitted from the playback signal processor 61 to an MPEG2 system layer decoder 63 via a buffer 62.

The MPEG2 system layer decoder 63 classifies the transmitted data into picture coding data and audio coding data. The picture coding data is transferred through a picture jitter preventing apparatus 64, a picture data buffer 65, and a picture decoder 67 in sequence. The audio coding data is transferred to an audio decoder 68 via an audio data buffer 66.

The picture jitter preventing apparatus 64 processes the picture coding data transmitted from the MPEG2 system layer decoder 63 as follows.

First, the picture coding extension region detector 51 detects the picture coding extension region from the input picture data and generates a detection signal signifying that the corresponding data section is a picture coding extension region. The picture coding extension region detector 51 then outputs the generated detection signal and the input picture data to the information region detector 53. Next, the information region detector 53 detects a region having the 'top_field_first' and 'repeat_first_field' information from the corresponding data section based on the detection signal received from the picture coding extension region detector 51. The detector 53 then generates an information region detection signal, which is output along with the input image data to the information converter 55. The information converter 55 receives the detection signal from the information region detector 53 and a fast play mode signal from the system controller 69 to convert the values of 'top_field_first' and 'repeat_first_field' into '1' and '0', respectively, if a corresponding data section is an information region on the fast play mode. Then, the information converter 55 transmits the converted data to the next processor. Since the 'top_field_first' and the 'repeat_first_field' always have the values of '1' and '0', respectively, in the fast play mode, the top field is output first and the field is not repeated. Accordingly, the top field and the bottom field are alternately output, resulting in a natural picture without jitter.

As described above, the picture jitter preventing apparatus of the picture decoder can output a picture without jitter when operating in the fast play mode from the picture signal coded in 24 frames per second. Also, the picture jitter preventing apparatus can easily be applied to a conventional circuit, due to its simple structure. The apparatus may also be implemented on a single integrated circuit, and be added in a picture decoder for commercial products.

What is claimed is:

1. A picture decoding apparatus for preventing picture jitter when operating in a fast play mode, said apparatus comprising:

a picture coding extension region detector for detecting a picture coding extension region from picture data, and outputting a detection signal and said picture data;

an information region detector, coupled to said picture coding extension region detector, for detecting a region having top_field_first and repeat_first_field information based on said detection signal and picture data output by said picture coding extension region detector, and outputting an information region signal and said picture data; and an information converter, coupled to said information region detector and responsive to a fast play mode signal, for converting values of top_field_first and repeat_first_field into 1 and 0, respectively, when in a fast play mode of operation, in accordance with said information region signal output by said information region detector and said fast play mode signal, and outputting said picture data.

2. The decoding apparatus as defined by claim 1, wherein said picture data is coded according to the MPEG2 standard.

3. A system comprising:

a signal processor for receiving a stream of data from a storage medium and storing said stream of data in a temporary buffer;

a system layer decoder, receiving said stream of data from said buffer, said decoder separating said stream of data into picture data and audio data; and a picture decoder, coupled to said system layer decoder for receiving said picture data, for outputting said picture data for reproduction, said picture decoder including a picture jitter preventing decoder for detecting a picture coding extension region from said picture data to generate a detection signal, detecting regions based on said detection signal and picture data, in which predetermined information is located, to generate an information region signal, and converting the values of said information in accordance with said information region signal and a fast play mode signal, in order to prevent picture jitter when operating in a fast play mode.

4. A system comprising:

a signal processor for receiving a stream of data from a storage medium and storing said stream of data in a temporary buffer;

a system layer decoder, receiving said stream of data from said buffer, said decoder separating said stream of data into picture data and audio data; and a picture decoder, coupled to said system layer decoder for receiving said picture data, and outputting said picture data for reproduction, said picture decoder including a picture jitter preventing decoder for preventing picture jitter when operating in a fast play mode, wherein said picture jitter preventing decoder comprises:

a picture coding extension region detector for detecting a picture coding extension region from said picture data, and outputting a detection signal and said picture data;

an information region detector, coupled to said picture coding extension region detector, for detecting selected regions based on said detection signal and picture data output by said picture coding extension region detector, and outputting an information region signal and said picture data; and an information converter, coupled to said information region detector and responsive to a fast play mode signal, for converting said values of said selected regions values when in a fast play mode of operation, in accordance with said information region signal output by said information region detector and said fast play mode signal, and outputting said picture data.

5. The system as defined by claim 4, wherein said selected regions include top_field_first and repeat_first_field information regions, and said top_field_first and repeat_first_field regions are converted to 1 and 0, respectively by said information converter.

6. The system as defined by claim 3, further comprising an audio decoder, coupled to said system layer decoder for receiving said audio data, and outputting said audio data for reproduction.

7. A method of decoding picture data and preventing picture jitter when operating in a fast play mode, said method comprising the steps of:

detecting a picture coding extension region from picture data, and outputting a detection signal with said picture data;

detecting a region having top_field_first and repeat_first_field information based on said detection signal and picture data, and outputting an information region signal and said picture data; and converting values of top_field_first and repeat_first_field into 1 and 0, respectively, when in a fast play mode of operation, in accordance with said information region signal and a fast play mode signal, and outputting said picture data free of picture jitter.

* * * * *